United States Patent [19]

Breslow

[11] 4,265,807
[45] May 5, 1981

[54] DISPROPORTIONATION OF ROSIN IN THE PRESENCE OF DITHIIN DERIVATIVES

[75] Inventor: David S. Breslow, Wilmington, Del.

[73] Assignee: Hercules Incorporated, Wilmington, Del.

[21] Appl. No.: 114,159

[22] Filed: Jan. 22, 1980

[51] Int. Cl.³ ............................ C09F 1/04; C07C 39/08
[52] U.S. Cl. ...................................... 260/97.5; 260/97; 260/106; 260/108; 260/453 RY; 549/20; 549/21; 549/22
[58] Field of Search ................ 260/97, 97.5, 106, 108

[56] References Cited

U.S. PATENT DOCUMENTS

| | | | |
|---|---|---|---|
| 3,377,333 | 4/1968 | Ciesielski et al. | 260/97.6 |
| 3,377,334 | 4/1968 | McBride et al. | 260/98 |
| 3,417,071 | 12/1968 | Wheelers | 260/108 |
| 3,423,389 | 1/1969 | Wheelers | 260/97.5 |
| 3,649,612 | 3/1972 | Scharrer | 260/98 |
| 3,872,073 | 3/1975 | Thorpe et al. | 260/106 |
| 3,929,703 | 12/1975 | Weymann et al. | 260/97.5 |
| 4,126,604 | 11/1978 | Alford et al. | 260/97.5 |

FOREIGN PATENT DOCUMENTS 602521 11/1976 U.S.S.R. .

*Primary Examiner*—H. S. Cockeram

[57] ABSTRACT

Disclosed is a method of disproportionating rosin comprising heating said rosin in the presence of a dithiin derivative such, for example, as 2,5-diphenyl dithiin. The method can be carried out at about 150° C. to about 300° C. for about 1 hour to about 10 hours with the longer reaction time corresponding to the lower temperatures. Preferably, the process is run at about 260° C. to about 300° C. for about 3 to 8 hours.

16 Claims, No Drawings

DISPROPORTIONATION OF ROSIN IN THE PRESENCE OF DITHIIN DERIVATIVES

This invention relates to the disproportionation and simultaneous bleaching of rosin and rosin mixtures.

The term "rosin", as used herein, includes tall oil rosin, wood rosin, gum rosin, mixtures containing any of these and, in general, any material containing abietic type acids, including tall oil fractions containing various proportions of rosin and fatty acids.

The main constituent of rosin is abietic acid and isomers thereof, including neoabietic, levopimaric, palustric, as well as dihydroabietic, dehydroabietic, pimaric and isopimaric acids. Since the conjugated double bonds of abietic acid render the rosin sensitive to oxidation it is important that the abietic acid content be reduced as low as necessary to assure stability of the rosin in its particular commercial use. This reduction of the abietic acid content can be achieved by disproportionation, i.e., the displacement of hydrogen in the abietic acid of the rosin to convert the same into benzenoid acids, particularly dehydroabietic acid, which acids lack normal double bond conjugation and are therefore more stable to oxidation than abietic acid.

It is known that rosin can be disproportionated by heating in the presence of various catalysts including iodine, sulfur dioxide and noble metals such as palladium and platinum. These catalysts suffer from several disadvantages, however, including the corrosiveness of the catalyst system, cost of the catalyst, and the inability to simultaneously bleach and disproportionate the rosin. Other catalysts have been developed which eliminate at least some of these disadvantages.

For example, distillation of tall oil in the presence of phenol sulfides has been found to produce condensates having improved color and stability (U.S. Pat. No. 3,377,333). The color of tall oil has also been improved by heating the tall oil in the presence of a phenol sulfide until a substantial lightening in color is obtained, while the abietic acid content of any rosin present is not allowed to fall below 15% (U.S. Pat. No. 3,423,389). These phenol sulfides have further been used to disproportionate rosin to abietic acid levels below 15% (U.S. Pat. No. 3,377,334), and to produce crystallization-resistant disproportionated rosin (U.S. Pat. No. 3,872,073).

The prior art also describes methods for bleaching and stabilizing tall oil rosin by heating the rosin in the presence of a 1,3,4-thiadiazole polysulfide (U.S. Pat. No. 3,417,071). Likewise, arylthiols (U.S. Pat. No. 3,649,612) and thiophene-thiols (Russian No. 602,521) have been used to bleach and disproportionate rosin.

The present invention concerns the use of certain heterocyclic sulfur compounds which act as disproportionation catalysts and bleaching agents for rosin and rosin-fatty acid mixtures. More specifically, it involves the use of dithiin derivatives as disproportionation catalysts and bleaching agents for rosin and rosin-fatty acid mixtures. The term dithiin derivatives, as used herein, refers to compounds containing the heterocyclic sulfur-containing ring structure:

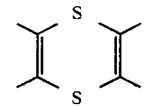

Examples of such dithiin derivatives include compounds having the formula:

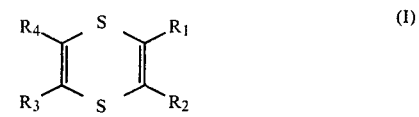

where $R_1$, $R_2$, $R_3$ and $R_4$ are selected from hydrogen; aryl, such, for example, as phenyl and naphthyl; substituted-aryl, such, for example, as alkylaryl, such as p-methylphenyl, alkoxyaryl, such as p-methoxyphenyl, aryl substituted aryl, such as p-phenyl phenyl, nitro substituted aryl, such as m-nitrophenyl and p-nitrophenyl, halo substituted aryl such as p-fluorophenyl, p-bromophenyl and p-chlorophenyl; alkyl, such, for example, as $C_1$–$C_4$ alkyl; halo, such, for example, as bromo; nitro; cyano; and heterocyclic radicals, such, for example, as thienyl; and at least one of $R_1$, $R_2$, $R_3$ and $R_4$ is other than hydrogen. Preferred dithiin derivatives include those derivatives wherein $R_1$ and $R_3$ in formula I are the same and other than hydrogen. These preferred dithiin derivatives include 2,5-diphenyldithiin; 2,5-di(2-naphthyl)dithiin; 2,5-di(p-methylphenyl)dithiin; 2,5-di(p-methoxyphenyl)dithiin; 2,5-di(p-phenylphenyl)dithiin; 2,5-di(p-nitrophenyl)dithiin; 2,5-di(m-nitrophenyl)dithiin; 2,5-di(p-fluorophenyl)dithiin; 2,5-di(p-chlorophenyl)dithiin; 2,5-di(p-bromophenyl)dithiin; 2,5-diphenyl-3,6-dimethyldithiin; 2,5-diphenyl-3,6-dibromodithiin; 2,5-diphenyl-3,6-dinitrodithiin; 2,5-diphenyl-3-nitrodithiin; 2,3,5,6-tetracyanodithiin; and 2,5-dithienyldithiin. A particularly preferred dithiin derivative is 2,5-diphenyldithiin.

The aryl and substituted-aryl dithiin derivatives used in this invention can be prepared by reacting alpha-halo acetophenones, or substituted alpha-halo acetophenones and sodium thiosulfate to form Bunte' salts. The Bunte' salts are then hydrolyzed with acid to phenacyl thiols which undergo a bimolecular ring closure to produce the dithiin derivative. The preparation of 2,5-diphenyldithiin is illustrated below as an example of this synthesis scheme.

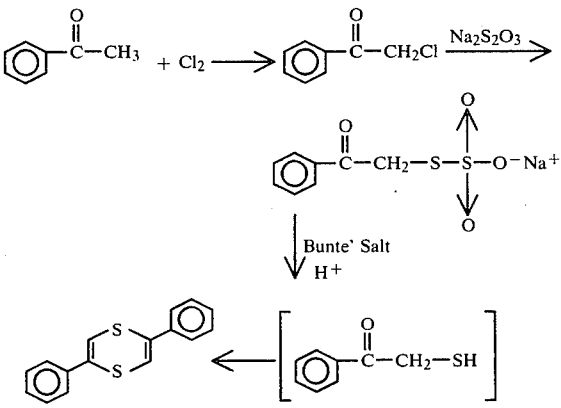

The thus prepared aryl and substituted-aryl dithiin derivatives can be further reacted to produce tri- and tetrasubstituted dithiin derivatives. For example, 2,5-diphenyldithiin can be subjected to brominating conditions to produce 2,5-diphenyl-3,6-dibromodithiin. Likewise, nitration of 2,5-diphenyldithiin produces 2,5-diphenyl-3-nitrodithiin and further nitration produces 2,5-diphenyl-3,6-dinitrodithiin.

In general, the process of this invention comprises heating rosin in the presence of the dithiin derivative to cause bleaching and disproportionation of the rosin. The degree of disproportionation can be controlled as desired by adjusting the reaction conditions and the amount of dithiin derivative. Under the same reaction conditions, i.e., time and temperature, the more dithiin derivative that is used, the lower the abietic acid content of the treated rosin.

The amount of dithiin derivative used will generally range from about 0.01% to about 5%, preferably from about 0.1% to about 2.0%, by weight of rosin. The dithiin derivative can be mixed with the rosin at room temperature, after the rosin has been heated to the reaction temperature, or at any point in between.

The process can be carried out at about 150° C. to about 300° C. for about 1 to about 10 hours with the longer reaction time corresponding to the lower temperatures. Preferably, the process is run at about 260° C. to about 300° C. for about 3 to 8 hours.

The disproportionation can be conducted at atmospheric or greater pressure, the higher pressures being desirable when volatile dithiin derivatives are used in order to minimize vaporization. The disproportionation is generally, though not necessarily, run under an inert atmosphere such as nitrogen, argon or steam in order to minimize oxidation.

The products of the process of this invention are suitable for a variety of uses, such as emulsifiers in the emulsion polymerization of unsaturated monomers.

The process of this invention is illustrated by the following examples wherein all parts and percentages are by weight. In those examples illustrating the use of dithiin derivatives as rosin disproportionation catalysts, i.e., Examples 1–24, the degree of disproportionation of the rosin is measured by the conversion of abietic acid to dehydroabietic acid. Thus, the percent abietic acid and dehydroabietic acid in the rosin is determined by UV analysis prior to and after dispropotionation (and in some examples at intermediate points during disproportionation). The amount of bleaching of the rosin during the disproportionation is determined (unless otherwise indicated) by comparing the color of the rosins to the U.S. Official Rosin Grades Standards provided by the U.S. Department of Agriculture. Also, it is desirable that the free acid content of the rosin remain substantially unchanged in the original and disproportionated rosins. Therefore, the acid numbers of the rosins are indicated in the examples.

EXAMPLE A

This example illustrates the preparation of 2,5-diphenyldithiin using the procedure reported in the Journal of the American Chemical Society, Vol. 58, page 262 (1936).

To 128 g. of sodium thiosulfate pentahydrate ($Na_2S_2O_3 \cdot 5H_2O$) in 152 ml. of water is added 78 g. of alpha-chloroacetophenone having the formula

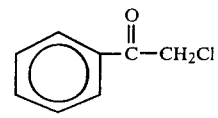

The mixture is stirred at 60° C. for 2 hours to give a clear solution. Then 152 ml. of ethanol and 304 ml. of concentrated aqueous HCl are added and the resulting mixture is stirred at reflux for 4 hours. An insoluble yellow oil forms. Upon cooling, a yellow semi-crystalline low melting solid is separated, washed and crystallized. NMR and mass spectral analyses show the product to be 2,5-diphenyldithiin having the formula

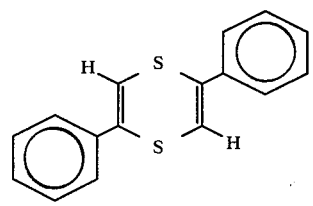

EXAMPLE 1

This example illustrates the disproportionation of tall oil rosin using 2,5-diphenyldithiin as catalyst.

A suitable vessel is flushed with nitrogen and charged with freshly broken lumps of tall oil rosin. The tall oil rosin is comprised of 89.4% rosin acids and 3.1% fatty acids, has an aqueous saponification number of 180 and contains 721 ppm. sulfur. 100 Parts of this rosin is heated to 280° C. and 1 part of 2,5-diphenyldithiin is added. The mixture is heated at 280°±2° C. for six hours, cooled to about 150° C. and analyzed. The results are shown in Table I. It should be noted that the abietic acid content of the original rosin interferes with the accurate measurement of the dehydroabietic acid content in the original rosin, and therefore the measurements are no better than ±5%.

TABLE I

| | Acid No. | Color | % Abietic Acid | % Dehydroabietic Acid |
|---|---|---|---|---|
| Original tall oil rosin | 172 | WG | 47 | 20 ± 5 |
| Disproportionated rosin | 156 | — | 0 | 38 |

EXAMPLES 2–4

The process described in Example 1 is repeated using various amounts of 2,5-diphenyldithiin. Samples are taken from each batch after heating for 2 hours, 4 hours and 6 hours for analysis. The results are shown in Table II below.

TABLE II

| Example | %(a) Catalyst | Time (hrs.) | Acid No. | Color | % Abietic Acid | % Dehydro-Abietic Acid |
|---|---|---|---|---|---|---|
| Original tall oil rosin | — | — | 172 | WG | 47 | 20 ± 5 |
| 2 | 0.25 | 2 | 155 | — | 8.6 | 39 |
| | | 4 | 148 | — | 5.3 | 42 |
| | | 6 | 144 | $X_3$ | 3.5 | 42 |
| 3 | 0.50 | 2 | 153 | — | 6.0 | 39 |
| | | 4 | 143 | — | 3.0 | 39 |

TABLE II-continued

| Example | %(a) Catalyst | Time (hrs.) | Acid No. | Color | % Abietic Acid | % Dehydro-Abietic Acid |
|---|---|---|---|---|---|---|
| | | 6 | 136 | X₃ | 1.3 | 40 |
| 4 | 0.75 | 2 | 161 | — | 1.9 | 35 |
| | | 4 | 156 | — | 0.63 | 36 |
| | | 6 | 154 | X₂ | 0.49 | 36 |

(a)weight percent based on weight of the rosin

EXAMPLES 5-7

The process of Example 1 is repeated using various rosins. In each of the following examples, the original rosin (designated as "Control") is disproportionated at 280° C. for 6 hours using 1% by weight based on the weight of the rosin of 2,5-diphenyldithiin. The results are shown in Table III below.

TABLE III

| Ex. No. | Rosin | | Acid No. | Color | % Abietic Acid | % Dehydro-Abietic Acid |
|---|---|---|---|---|---|---|
| 5 | M-Wood | Control | 161 | I₃ | 52 | 10 ± 5 |
| | | Disproportionated rosin | 148 | WW₀ | 1.1 | 26 |
| 6 | Gum | Control | 168 | K₄ | 74 | 10 ± 5 |
| | | Disproportionated rosin | 156 | X₂ | 0.21 | 26 |
| 7 | Tall oil(b) | Control | 177 | 12+(c) | 30 | 20 ± 5 |
| | | Disproportionated tall oil | 155 | 11(c) | 2.1 | 18 |

(b)Pamak 45 (Hercules Incorporated) - 44.4% rosin acid, 48.7% fatty acid, aq. sap. no. - 180; sulfur - 445 ppm.
(c)Gardner color using Hellige Comparator.

EXAMPLE B

This example illustrates the preparation of 2,5-di(p-chlorophenyl)dithiin using the procedure reported in the Journal of Heterocyclic Chemistry, Vol. 9, page 887 (1972).

To 43 g. of $Na_2S_2O_3.5H_2O$ in 52 ml. of water is added 38.4 g. of alpha-bromo-p-chloroacetophenone in 20 ml. of dioxane. This mixture is stirred at 60° C. for 2 hours. Then 30 ml. of ethanol and 99 ml. concentrated HCl are added and the resulting mixture is refluxed for 4 hours. An insoluble yellow oil forms. After cooling, a yellow low melting solid is separated, washed and crystallized. NMR analysis shows the product to be 2,5-di(p-chlorophenyl)-dithiin having the formula:

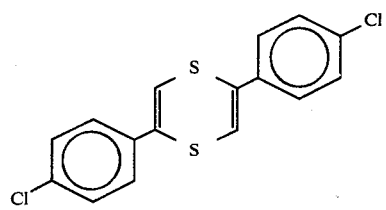

EXAMPLE 8

This example illustrates the disproportionation of tall oil rosin using 2,5-di(p-chlorophenyl)dithiin as catalyst.

A suitable vessel is flushed with nitrogen and charged with freshly broken lumps of tall oil rosin. The rosin is the tall oil rosin used in Example 1. 100 Parts of this rosin is heated to 200° C. and 1 part of 2,5-di(p-chlorophenyl)dithiin is added. The mixture is heated at 200° C. for 2 hours, at which point a sample is taken for analysis. The temperature of the mixture is increased to 240° C. and maintained at that temperature for 2 hours and another sample taken and analyzed. The temperature is then increased to 280° C. and the mixture heated at that temperature for an additional 2 hours. A final sample is taken and analyzed. The results are shown in Table IV below.

TABLE IV

| | Acid No. | Color | % Abietic Acid After | | |
|---|---|---|---|---|---|
| | | | 2 hrs. | 4 hrs. | 6 hrs. |
| Original tall oil rosin | 172 | WG | — | — | 47 |
| Disproportionated rosin | 158(d) | X(d) | 39 | 20 | 4 |

(d)After 6 hours.

EXAMPLE C

This example describes the preparation of 2,5-di(p-bromophenyl)dithiin using the procedure reported in the Journal of Heterocyclic Chemistry, Vol. 9, page 887 (1972).

To 48 g. of $Na_2S_2O_3.5H_2O$ in 57 ml. of water are added 50 g. of alpha-bromo-p-bromoacetophenone and 20 ml. of dioxane. The mixture is stirred at 60° C. for 2 hours. Then 35 ml. of ethanol and 110 ml. concentrated aqueous HCl are added and the resulting mixture is stirred at refluxing temperature for 4 hours. An insoluble yellow low melting solid forms which is separated, washed and crystallized. NMR analysis shows the product to be 2,5-di(p-bromophenyl)dithiin having the formula:

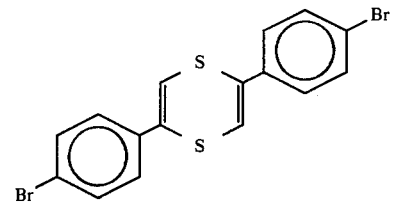

EXAMPLE D

This example illustrates the preparation of 2,5-di(p-methylphenyl)dithiin using the procedure reported in the Journal of Heterocyclic Chemistry, Vol. 9, page 887 (1972).

To 67 g. of p-methylacetophenone in 200 ml. hexane at 15°-17° C. is added 80 g. of bromine over a period of 30 minutes. A soft semi-crystalline low melting solid separates. Upon removal of the hexane, 124 g. of yellow-red crystals are obtained to which is added 150 g. of $Na_2S_2O_3.5H_2O$ in 180 ml. of water. The mixture is stirred for ½ hour as it is warmed to 60° C. and then stirred for 1 hour at 60° C. The solution is cooled and 300 ml. of ethanol is added. The mixture is then cooled to 20° C. A white crystalline mass is obtained. It is added to a mixture of 240 ml. of methanol, 120 ml. water, and 240 ml. concentrated aqueous HCl and the resulting mixture is stirred at refluxing temperature for 12 hours. A soft crystalline solid separates which is collected and crystallized. NMR analysis shows this product to be 2,5-di(p-methylphenyl)-dithiin having the formula:

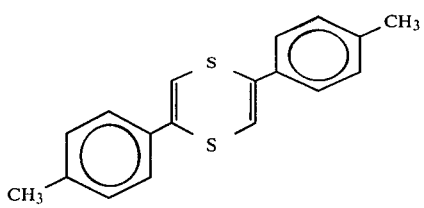

EXAMPLE E

This example illustrates the preparation of 2,5-di(p-nitrophenyl)dithiin using the procedure reported in the Journal of Heterocyclic Chemistry, Vol. 9, page 887 (1972).

To 82.5 g. of p-nitroacetophenone in 200 ml. of glacial acetic acid at 20°-25° C. is added 80 g. of bromine dropwise over 30 minutes. The resulting solution is cooled to 8° C. A precipitate forms during cooling which is filtered, washed and partially dried. 109 g. of wet alpha-bromo-p-nitroacetophenone is obtained. It is added to 109 g. of $Na_2S_2O_3.5H_2O$ in 400 ml. of 70% methanol. The mixture is stirred, warmed to 60° C. and allowed to stand overnight. The mixture is cooled and a solid precipitates which is filtered and dried. The resulting cake is added to 600 ml. water, 600 ml. acetic acid and 300 ml. concentrated aqueous HCl. This mixture is stirred at refluxing temperature for 6 hours. An orange-red precipitate forms which is recovered and dried. NMR analysis indicates that the product is 2,5-di(p-nitrophenyl)dithiin having the structure:

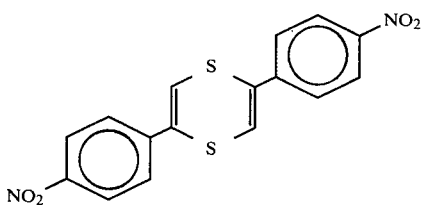

EXAMPLE F

The following example describes the synthesis of 2,5-di-(p-methoxyphenyl)dithiin using the procedure reported in the Journal of Heterocyclic Chemistry, Vol. 9, page 887 (1972).

To 28 g. of $Na_2S_2O_3.5H_2O$ in 50 ml. water and 150 ml. ethanol is added 25 g. of alpha-bromo-p-methoxyacetophenone. The mixture is stirred at 50° C. for 1 hour. The resulting clear solution is stripped of about 100 ml. ethanol, leaving a white crystalline paste. The paste is added to 100 ml. water, 160 ml. acetic acid, and 80 ml. concentrated aqueous HCl and the resulting mixture is stirred at refluxing temperature for 4 hours. A yellow solid separates which is filtered, washed and dried. NMR analysis of this solid shows it to be 2,5-di-(p-methoxyphenyl)dithiin having the formula:

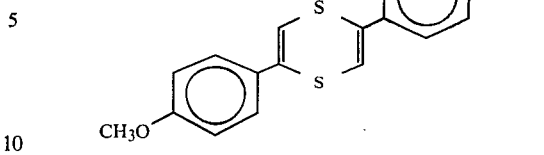

EXAMPLE G

This example illustrates the preparation of 2,5-diphenyl-3-nitrodithiin using the procedure reported in the Journal of the American Chemical Society, Vol. 77, page 68 (1955).

A solution of 0.5 g. urea in 31.6 ml. of concentrated $HNO_3$ is made and diluted up to 50 ml. with glacial acetic acid. At room temperature, 4 ml. of this solution is added quickly with shaking to a solution of 10 g. of 2,5-diphenyldithiin in 500 ml. of acetic anhydride. The solution is allowed to stand for 5 minutes and then diluted with 500 g. of ice. The resulting mixture is allowed to stand for 3 hours as the acetic anhydride hydrolyzes. A red precipitate forms which is filtered, washed, dried and recrystallized. NMR analysis shows the product to be 2,5-diphenyl-3-nitrodithiin having the structure:

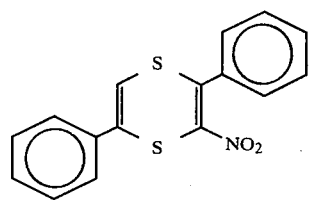

EXAMPLE H

This example illustrates the preparation of 2,5-diphenyl-3,6-dinitrodithiin using the procedure reported in the Journal of the American Chemical Society, Vol. 78, page 850 (1956).

To 10 g. of 2,5-diphenyldithiin in 250 ml. of acetic anhydride at 30° C. is added dropwise with stirring 10 ml. of nitration solution (31.6 ml. concentrated $HNO_3$ and 0.5 g. urea diluted up to 50 ml. with acetic acid) over 10 minutes. After 10 minutes of stirring at 25° C., a precipitate forms which is recovered. NMR analysis shows this product to be 2,5-diphenyl-3,6-dinitrodithiin having the structure:

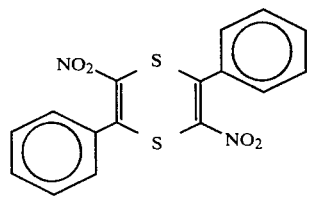

EXAMPLE I

This example illustrates the preparation of 2,5-diphenyl-3,6-dibromodithiin using the procedure reported in the Journal of the American Chemical Society, Vol. 78, page 850 (1956).

To 8.5 g. of 2,5-diphenyldithiin in 200 ml. of acetic anhydride is added dropwise with stirring a solution of 10.4 g. of bromine in 12 ml. of glacial acetic acid. The resulting mixture is stirred for 15 minutes and cooled, whereupon a precipitate forms. The precipitate is recovered and NMR analysis shows it to be 2,5-diphenyl-3,6-dibromodithiin having the structure:

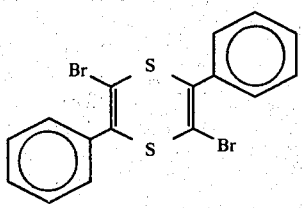

EXAMPLES 9-15

The dithiin derivatives prepared in Examples C-I are used as catalysts for the disproportionation of the tall oil rosin used in Example 1 following the procedure described in Example 8. The acid number, color and abietic acid level of each of the disproportionated products are indicated in Table V below, acid number and color being measured after heating for 6 hours.

TABLE V

| Ex. No. | Dithiin Derivative from Example | Acid No. | Color | % Abietic Acid After | | |
|---|---|---|---|---|---|---|
| | | | | 2 hrs. | 4 hrs. | 6 hrs. |
| Original tall oil rosin | | 172 | WG | — | — | 47 |
| 9 | C | 148 | X-XA | 44 | 21 | 7 |
| 10 | D | 149 | WW-X | 38 | 18 | 3 |
| 11 | E | 150 | WW | 39 | 25 | 9 |
| 12 | F | 158 | WW3 | 38 | 16 | 1.6 |
| 13 | G | 154 | X | 41 | 32 | 14 |
| 14 | H | 151 | WW | 43 | 34 | 18 |
| 15 | I | 140 | WG | 25 | 3.1 | 1.1 |

EXAMPLE J

This example illustrates the preparation of 2,5-di(p-fluorophenyl)dithiin using the procedure reported in the Journal of Heterocyclic Chemistry, Vol. 13, page 57 (1976).

To 37 g. of $Na_2S_2O_3.5H_2O$ in 90 ml. water and 200 ml. ethanol is added 25 g. of alpha-chloro-p-fluoroacetophenone. The resulting mixture is stirred at 60° C. for 1 hour, then stripped of ethanol, leaving a cream-colored crystalline solid. The solid is added to 180 ml. water, 220 ml. acetic acid, and 110 ml. concentrated aqueous HCl. The resulting solution is stirred at refluxing temperature for 4 hours. A solid separates which is recovered, NMR analysis shows this product to be 2,5-di(p-fluorophenyl)dithiin having the structure:

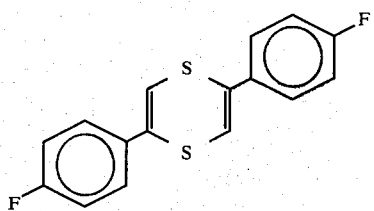

EXAMPLE K

This example illustrates the preparation of 2,5-di(p-phenylphenyl)dithiin using the procedure reported in the Journal of Heterocyclic Chemistry, Vol. 9, page 887 (1972).

To 25 g. of acetylbiphenyl in 250 ml. methylene dichloride at 20° C. is added dropwise with stirring 20.5 g. of bromine over 30 minutes. The solution is stripped leaving a brown solid. This solid is added to 30 g. of $Na_2S_2O_3.5H_2O$ in 300 ml. of 70% ethanol. The resulting mixture is stirred and heated to 60° C. and held there for 1 hour. A solid forms and is separated and added to a mixture of 235 ml. water, 480 ml. acetic acid, and 125 ml. concentrated aqueous HCl. The resulting mixture is stirred at refluxing temperature for 4 hours. A solid separates upon cooling. Analysis shows it to be 2,5-di(p-phenylphenyl)dithiin having the structure:

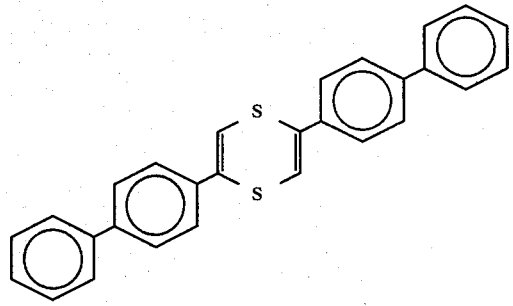

EXAMPLE L

This example illustrates the preparation of 2,5-di(m-nitrophenyl)dithiin using the procedure reported in the Journal of Heterocyclic Chemistry, Vol. 58, page 262 (1936).

To 11 g. of $Na_2S_2O_3.5H_2O$ in 75 ml. of ethanol and 25 ml. of water is added 10 g. of alpha-bromo-m-nitroacetophenone. The resulting mixture is stirred at 60° C. for 2 hours. To this mixture are added 75 ml. glacial acetic acid and 50 ml. concentrated aqueous HCl. The mixture is stirred at refluxing temperature for 4 hours. A solid separates and is recovered. Analysis shows it to be 2,5-di(m-nitrophenyl)dithiin having the structure:

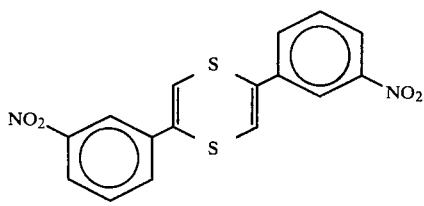
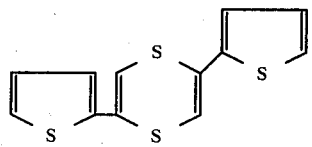

EXAMPLE M

This example illustrates the preparation of 2,5-di(2-naphthyl)dithiin using the procedure reported in the Journal of Heterocyclic Chemistry, Vol. 58, page 262 (1936).

To 60 g. of 2-acetonaphthalene in 200 ml. of methylene dichloride at 20° C. is added 56.5 g. of bromine with stirring over 30 minutes. The methylene dichloride is stripped from the mixture and a crystalline mass is collected. This mass is added to 90 g. of $Na_2S_2O_3.5H_2O$ in 700 ml. of 70% ethanol. The resulting mixture is stirred at 60° C. for 1 hour. A solid forms and is separated and added to a mixture of 400 ml. water, 550 ml. acetic acid and 225 ml. concentrated aqueous HCl. The resulting mixture is stirred at refluxing temperature for 4 hours. Upon cooling, a solid separates and is recovered. NMR analysis shows this product to be 2,5-di(2-naphthyl)dithiin having the formula:

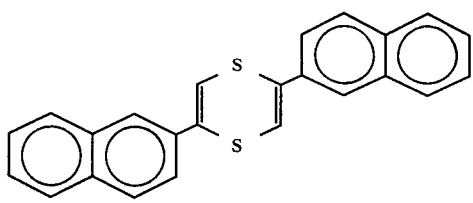

EXAMPLE N

This example illustrates the preparation of 2,5-dithienyldithiin using the procedure reported in the Journal of the American Chemical Society, Vol. 79, page 1972 (1957).

2-Chloroacetylthiophene is prepared by introducing 42 g. of chlorine into a mixture of 2-acetylthiophene and 200 ml. of carbon tetrachloride at 25° C. with stirring and under ultraviolet illumination. The 2-chloroacetylthiophene is recovered as a crystalline mass.

60 g. of the 2-chloroacetylthiophene is added to a mixture of 110 g. of $Na_2S_2O_3.5H_2O$ and 150 ml. water. The resulting mixture is stirred at 60° C. for 2 hours and for 1 more hour as it is allowed to cool. A precipitate forms and is collected, and 67.8 g. of it is dissolved in a mixture of 250 ml. water, 250 ml. ethanol, and 250 ml. concentrated aqueous HCl. The resulting solution is stirred at refluxing temperature for 4 hours and then cooled. A dark red oil is recovered which contains the product 2,5-dithienyldithiin having the structure:

EXAMPLE O

This example illustrates the preparation of 2,5-diphenyl-3,6-dimethyldithiin using the procedure reported in the Journal of the American Chemical Society, Vol. 58, page 262 (1936).

To 70 g. of propiophenone in 300 ml. of chloroform at 20°–25° C. is added 80 g. of bromine dropwise with stirring over 1 hour. The chloroform is removed, leaving a viscous red liquid to which are added 120 g. of $Na_2S_2O_3.5H_2O$ in 200 ml. water and 500 ml. of ethanol. The resulting mixture is heated at 60° C. with stirring for 1 hour. A cream-colored paste forms and is separated and added to 400 ml. water, 600 ml. acetic acid, and 300 ml. concentrated aqueous HCl. This mixture is stirred at refluxing temperature for 4 hours. A viscous red liquid separates which is collected and crystallized. NMR analysis indicates this product to be 2,5-diphenyl-3,6-dimethyldithiin having the structure:

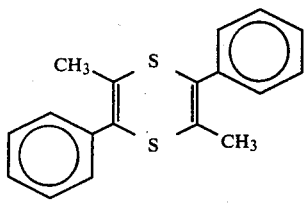

EXAMPLE P

This example illustrates the preparation of 2,3,5,6-tetracyanodithiin using the procedure reported in the Journal of the American Chemical Society, Vol. 84, pages 4746, 4756, 4772 (1962).

To 19.6 g. of sodium cyanide in 120 ml. dry dimethyl formamide (DMF) at 10°–15° C. is added 30.4 g. of carbon disulfide dropwise with stirring. The resulting mixture is stirred at 10°–15° C. for 30 minutes and 200 ml. of t-butyl alcohol is added. This mixture is stirred at 45° C. for 5 minutes and filtered. The filtrate is cooled to 0° C. and a solid forms and is filtered off. The product obtained is sodium cyanodithiocarbamate having the structure:

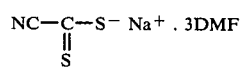

106 g. of sodium cyanodithiocarbamate is dissolved in 340 ml. of chloroform. This solution is stored at room temperature. After 7 days, the solution contains a yellow precipitate. The solution is centrifuged, the solid recovered and mixed with 200 ml. dry ether, filtered and dried. The resulting solid is then dissolved in 300 ml. of boiling methanol. The hot solution is filtered and the filtrate concentrated to about one-half volume. The residual solution is cooled and diluted with 100 ml. dry ether. A yellow precipitate forms and is recovered and recrystallized in ethanol. This product is disodium cis-1,2-dicyanoethene-1,2-dithiol having the structure:

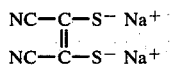

To 11.7 g. of the disodium cis-1,2-dicyanoethene-1,2-dithiol slurried in 80 ml. of tetrahydrofuran at 0° C. is added dropwise over 45 minutes 7 g. of thionyl chloride in 10 ml. of tetrahydrofuran. The resulting mixture is stirred for 45 minutes as it warms to room temperature. It is filtered and the filtrate is evaporated to dryness, leaving a buff yellow powder. The powder is recrystallized in toluene. Analysis shows this product to be 2,3,5,6-tetracyanodithiin having the structure:

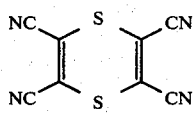

EXAMPLE Q

This example illustrates the preparation of 2,5-dimethyldithiin following the basic procedure reported in the Journal of the American Chemical Society, Vol. 81, page 5993 (1959).

To 58 g. of propionaldehyde in 300 ml. ethyl acetate is added dropwise over a 3-hour period at 0°-5° C. a solution of 45 ml. of bromine in 100 ml. of ethyl acetate. The resulting clear solution is added to 500 ml. of ethanol and allowed to stand at room temperature for 24 hours. The solution is then distilled at 40° C. and 20 torr and about 500 ml. of distillate is removed. The residue is added to a cold solution of 300 g. of K₂CO₃ in 300 ml. of water. A red liquid separates and ether is added to aid the separation. The organic layer is washed with cold water and dried over MgSO₄. The ether is distilled off at 25° C. and 20 torr leaving a dark red residue. This residue is distilled and a fraction of 123.5 g. of nearly water-white liquid is collected at 87°-96° C. at 33 torr. Analysis of this product shows it to be 2-bromopropionaldehyde diethylacetal having the formula:

$$CH_3-\underset{Br}{CH}-CH(OC_2H_5)_2$$

To 98 g. of sodium sulfide in 490 ml. of ethanol is added 26.2 g. of sulfur. The resulting mixture is stirred at refluxing temperature for 10 minutes to give a dark red solution. Then 114 g. of 2-bromopropionaldehyde diethylacetal is added dropwise to the dark red solution at refluxing temperature. The resulting mixture is stirred for 3 hours at refluxing temperature, cooled to 25° C., and 24 g. of NaHCO₃ is added to the mixture. About 450 ml. of ethanol is removed by distilling the mixture at 40° C. and 40 torr. A black residue remains to which is added 270 ml. of water and 400 ml. of ether. The ether layer is separated, washed with water, with 5% aqueous NaOH, with brine and again with water. The ether is distilled off leaving 87 g. of a light red liquid. Analysis of this product shows it to be di(1,1-diethoxy-2-propyl)disulfide having the formula:

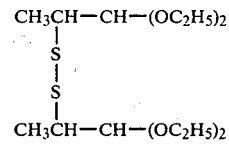

To 16 g. of LiAlH₄ in 500 ml. of ether stirred at refluxing temperature is added dropwise over a one hour period 85 g. of di(1,1-diethoxy-2-propyl)disulfide. Another 16 g. of LiAlH₄ is then added with an additional 300 ml. of ether. The resulting mixture is stirred at refluxing temperature for 2 hours. It is cooled to 10° C. and 250 ml. of water is added dropwise to give a thick slurry. CO₂ gas is bubbled into the mixture until the pH is about 7. Brine is added and the ether layer is separated. The ether is removed by distillation leaving 49 g. of a yellow liquid. Analysis shows this product to be 2-mercaptopropionaldehyde diethylacetal having the formula:

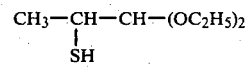

To 300 ml. of toluene is added 1 g. of p-toluenesulfonic acid. The resulting mixture is refluxed with a water trap in the reflux return to remove water. After the water is removed, 45 g. of 2-mercaptopropionaldehyde diethylacetal is added and the resulting solution stirred at refluxing temperature for 2 hours. The solution is then cooled to room temperature, washed with three 25 ml. portions of 10% NaOH, then with brine and dried over MgSO₄. The resulting solution is filtered and stripped leaving 40 g. of yellow liquid. Analysis shows that this liquid contains the product 2,5-dimethyl-3,6-diethoxydithiane having the formula:

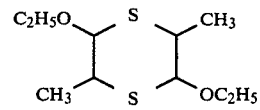

A cracking furnace tube is filled with alumina catalyst pellets and placed in a furnace. The furnace is heated to 250°-275° C. for 48 hours while 500 ml./minute of N₂ is passed through the tube. The furnace temperature is then lowered to 220° C. and 10 ml. of absolute ethanol is run into the top of the furnace at 1 ml. per minute. Then a solution of 2,5-dimethyl-3,6-diethoxydithiane in 30 ml. absolute ethanol is run into the furnace over a period of 2¼ hours. The material coming from the furnace is collected in a dry ice trap as a yellow liquid. This yellow liquid is diluted with ether, washed with 5% aqueous NaOH, and then washed twice with brine. The ether is removed leaving a yellow liquid. Analysis shows this liquid contains two products, 2,5-dimethyl-3-ethoxy-1,4-dithiene having the formula:

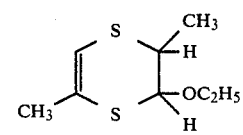

and 2,5-dimethyldithiin having the formula:

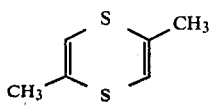

EXAMPLES 16-24

These examples illustrate the disproportionation of tall oil rosin using the dithiin derivatives prepared in Examples J-Q as catalysts.

The tall oil rosin used in Example 1 is disproportionated following the procedure of Example 1, using each of the dithiin derivatives from Examples J-Q. The acid number, color, and abietic acid and dehydroabietic acid levels for the disproportionated products are shown in Table VI below.

TABLE VI

| Ex. No. | Dithiin Derivative from Example | Acid No. | Color | % Abietic Acid | % Dehydro- abietic Acid |
|---|---|---|---|---|---|
| Original tall oil rosin | | 172 | WG | 47 | 20 ± 5 |
| 16 | J | 155 | WG$_6$ | 0.7 | 35 |
| 17 | K | 145 | WW | 1.8 | 39 |
| 18 | L | 142 | N-WG | 2.6 | 43 |
| 19 | M | 146 | WW$_6$ | 1.1 | 38 |
| 20$^{(e)}$ | M | 162 | X-X$_A$ | 6.0 | 32 |
| 21 | N | 146 | WW | 5.3 | 41 |
| 22$^{(f)}$ | O | 153 | WG$_2$ | 29 | 20 |
| 23 | P | 146 | E$^{(g)}$ | 12 | 45 |
| 24 | Q | 133 | E$^{(g)}$ | 1.5 | 43 |

$^{(e)}$Disproportionation was run at 250° C. instead of 280° C.
$^{(f)}$Disproportionation was run at 270° C. instead of 280° C.
$^{(g)}$Darker than E.

What I claim and desire to protect by Letters Patent is:

1. A method of disproportionating rosin comprising heating said rosin in the presence of a dithiin derivative at a temperature of from about 150° C. to about 300° C. for from about 1 hour to about 10 hours.
2. The method of claim 1 wherein the dithiin derivative is 2,5-diphenyl dithiin.
3. The method of claim 1 wherein the dithiin derivative is 2,5-di(p-methoxyphenyl)dithiin.
4. The method of claim 1 wherein the dithiin derivative is 2,5-diphenyl-3,6-dibromodithiin.
5. The method of claim 1 wherein the dithiin derivative is 2,5-di(p-fluorophenyl)dithiin.
6. The method of claim 1 wherein the dithiin derivative is 2,5-di(p-phenylphenyl)dithiin.
7. The method of claim 1 wherein the dithiin derivative is 2,5-di(2-naphthyl)dithiin.
8. The method of claim 1 wherein the dithiin derivative is 2,5-dimethyldithiin.
9. A method of disproportionating rosin comprising heating said rosin in the presence of a dithiin derivative at a temperature of from about 260° C. to about 300° C. for about 3 hours to about 8 hours.
10. The method of claim 9 wherein the dithiin derivative is 2,5-diphenyl dithiin.
11. The method of claim 9 wherein the dithiin derivative is 2,5-di(p-methoxyphenyl)dithiin.
12. The method of claim 9 wherein the dithiin derivative is 2,5-diphenyl-3,6-dibromodithiin.
13. The method of claim 9 wherein the dithiin derivative is 2,5-di(p-flouorphenyl)dithiin.
14. The method of claim 9 wherein the dithiin derivative is 2,5-di(p-phenylphenyl)dithiin.
15. The method of claim 9 wherein the dithiin derivative is 2,5-di(2-naphthyl)dithiin.
16. The method of claim 9 wherein the dithiin derivative is 2,5-dimethyldithiin.

* * * * *